May 26, 1942.  T. F. HASSETT  2,284,520
PROCESS AND APPARATUS FOR PRODUCING RUBBER ARTICLES
Filed June 12, 1940  4 Sheets-Sheet 1
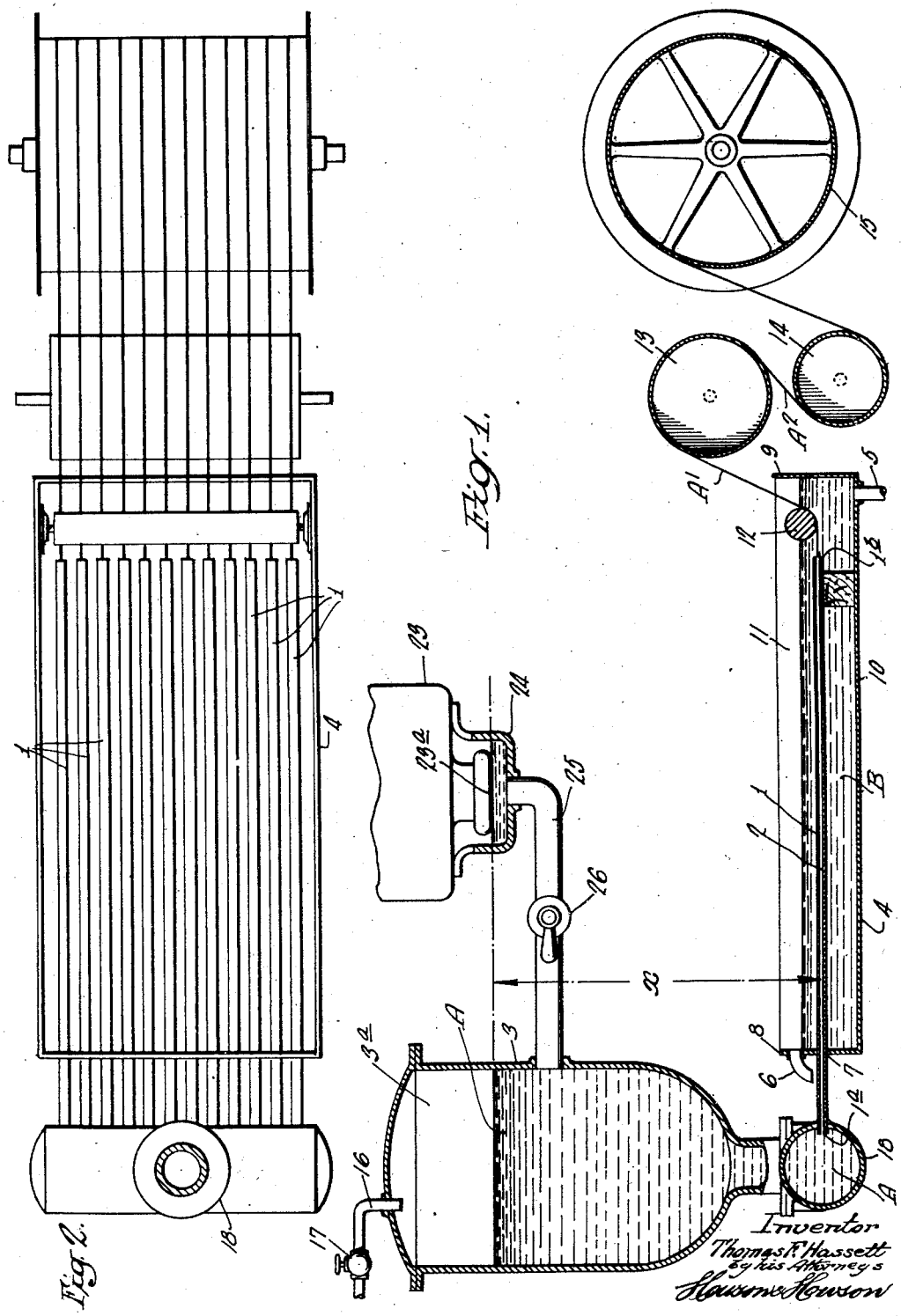

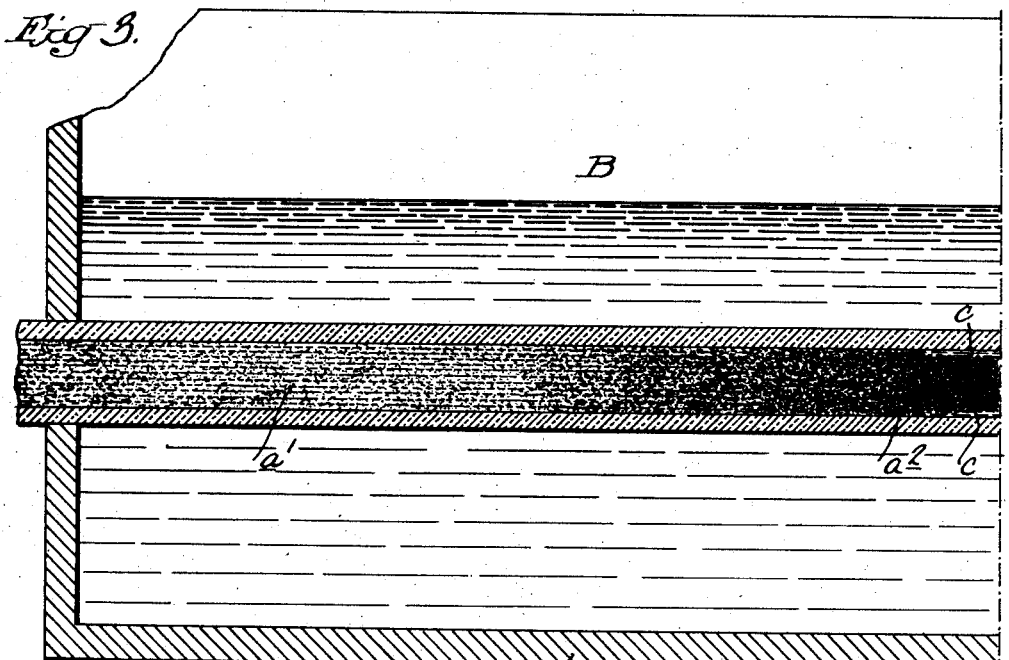
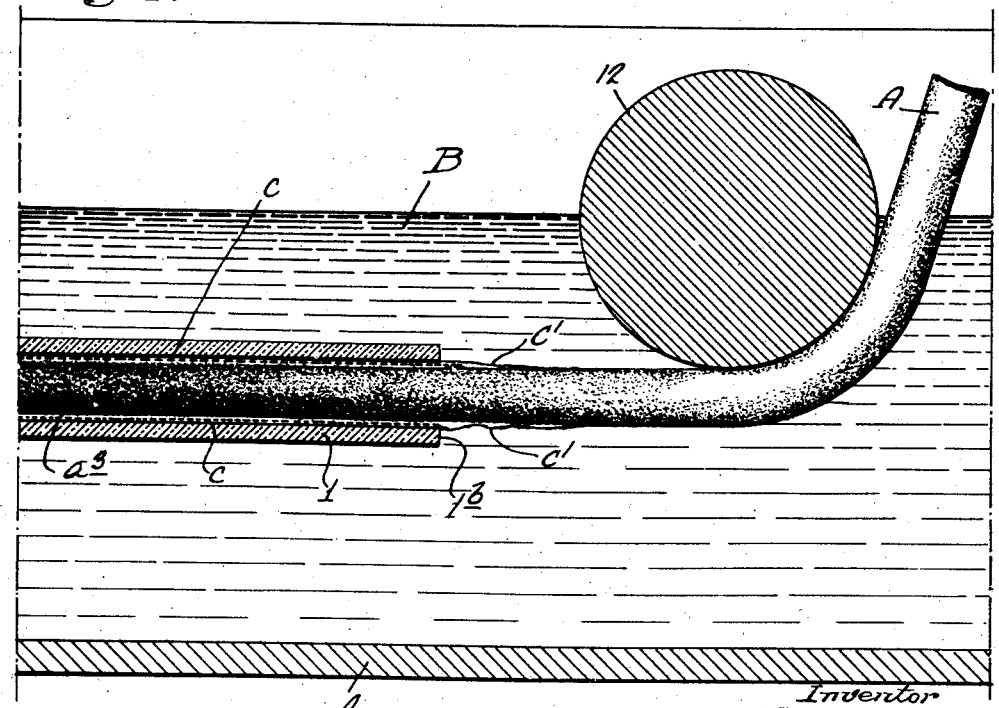

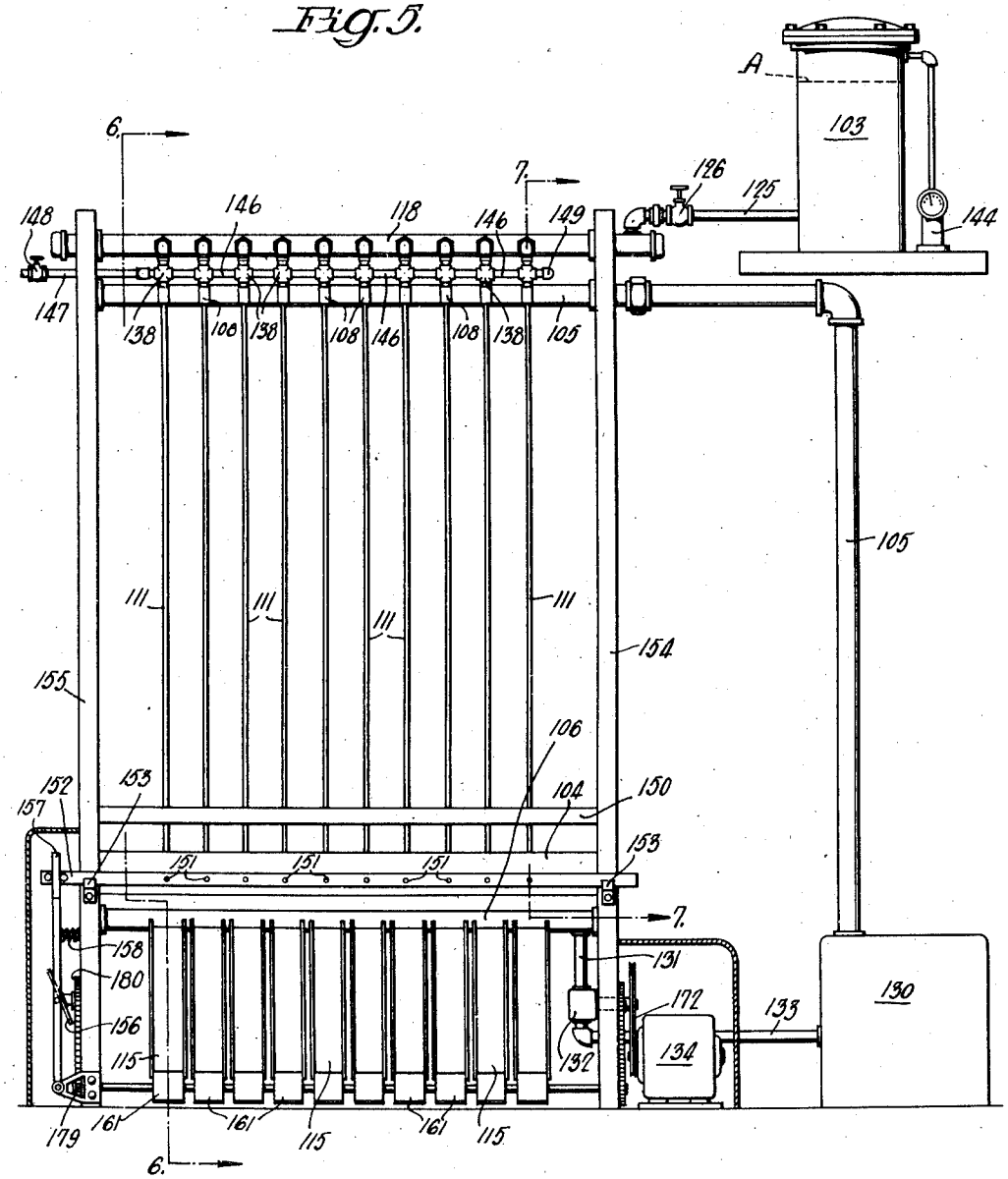

May 26, 1942. T. F. HASSETT 2,284,520
PROCESS AND APPARATUS FOR PRODUCING RUBBER ARTICLES
Filed June 12, 1940 4 Sheets-Sheet 4
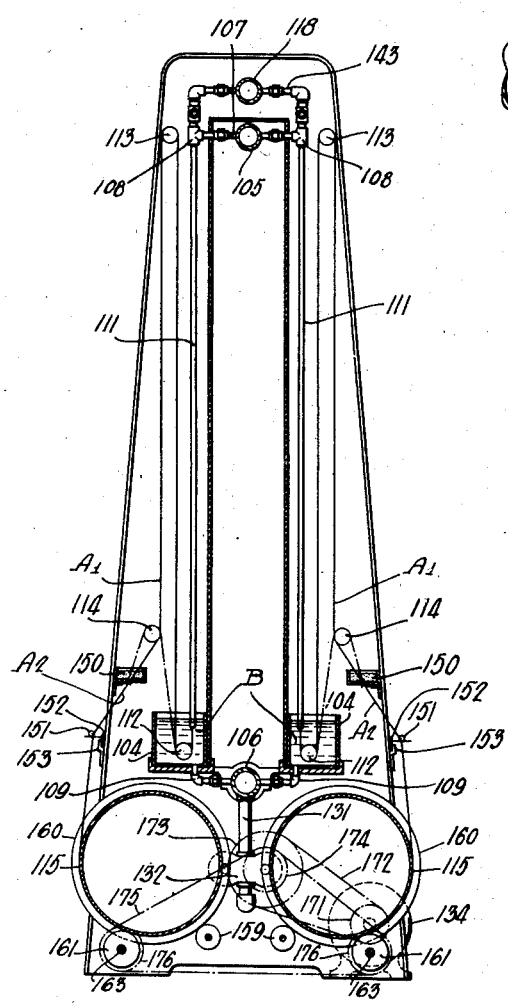
Fig. 6.
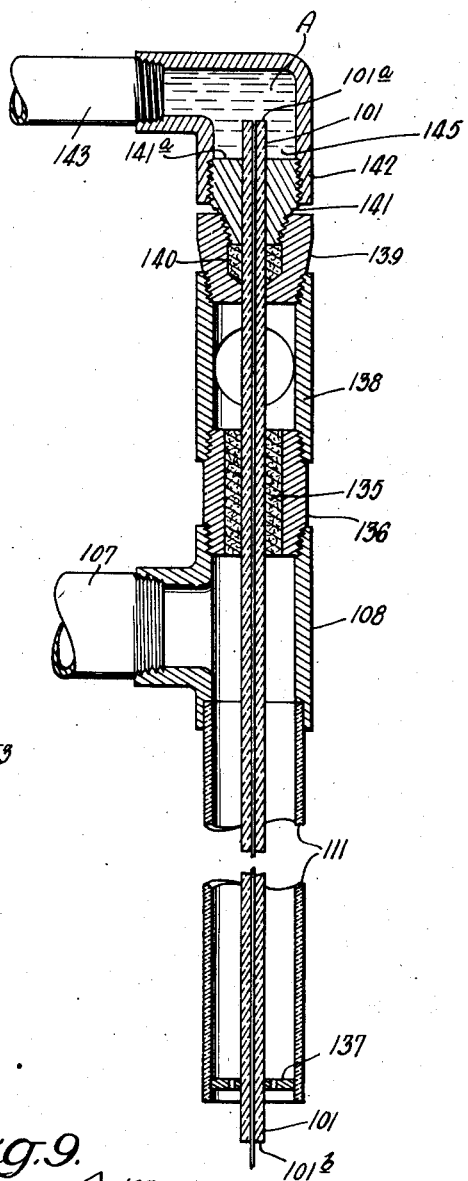
Fig. 7.
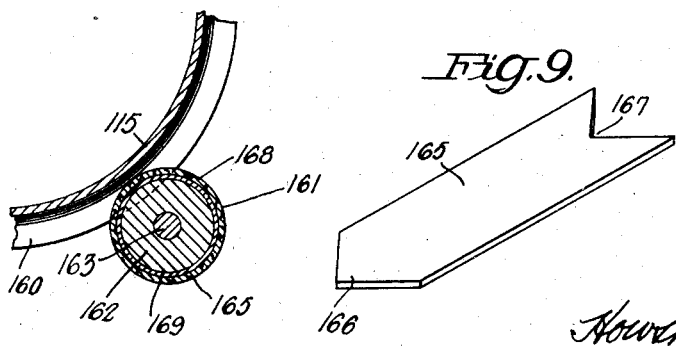
Fig. 8.
Fig. 9.
Inventor:-
Thomas F. Hassett
by his Attorneys
Howen & Howen Patented May 26, 1942

2,284,520

UNITED STATES PATENT OFFICE 2,284,520

PROCESS AND APPARATUS FOR PRODUCING RUBBER ARTICLES

Thomas F. Hassett, Philadelphia, Pa.

Application June 12, 1940, Serial No. 340,218

7 Claims. (Cl. 18—8)

This application is a continuation-in-part of application Serial No. 290,319, filed August 15, 1939.

This invention relates to the manufacture of rubber articles, such as threads, strips, sheets and the like; and more particularly to the production of filaments of circular or other cross-sectional contours.

Rubber filaments or strips of round and other cross-sectional shapes have been produced by numerous methods, including an ancient process described by Franz Clouth in his book entitled "India Rubber, Gutta Percha and Balata," published by D. Van Nostrand Co., in 1903, wherein rubber in a more or less liquid state is described as being forced through holes punched in a tin plate, onto an endless cloth strewn with talc, on which the soft threads rest while the volatile constituent evaporates.

Another method of the prior art is disclosed in the Hopkinson and Gibbons U. S. Patent No. 1,545,257, wherein a liquid latex compound is forced under pressure from an extruding die nozzle into a bath of acetic acid, causing immediate coagulation of the solid constituents into a form corresponding to the contour of the discharge end of the nozzle, as the liquid compound emerges from the nozzle and enters the acid in which the discharge end of the nozzle is submerged.

Under another method disclosed in the U. S. patents to Pestalozza, No. 1,717,248 and No. 2,084,702, a latex coagulant is introduced into the liquid latex and the nozzle is heated to a coagulating temperature at and adjacent the discharge end of the nozzle, whereby coagulation takes place inside the delivery end of the nozzle through which the filament, shaped cross-sectionally to the internal contour of the nozzle, is extruded by pressure applied to the liquid latex within the supply container to which the nozzle is connected. This, and various other procedures involving the use of so-called "heat-sensitive" latex compounds, are based upon the gelling effect of recognized coagulants for latex, when such coagulants are employed in limited quantity.

According to an improved method on which the Pestalozza invention is predicated, a second section of the nozzle, intermediate the supply reservoir and the coagulating zone adjacent the discharge mouth of the nozzle, is heated to a temperature slightly lower than the coagulating temperature, to produce a pre-warming of the latex prior to its entering the coagulating zone, to facilitate and accelerate the coagulation, the latex being forced under pressure from the reservoir through the lower-temperature pre-warming zone of the nozzle into and through the higher-temperature coagulating zone, from which it is extruded through and out of the mouth of the nozzle.

Each of the methods noted above is subject to certain disadvantages. For example, the ancient method disclosed by Clouth requires a belt of great length, to provide a sufficient interval between extrusion of the filaments and complete volatilization of the liquid constituent to permit the solidified filament to be thereafter wound in a package.

The Hopkinson and Gibbons method requires the use of the acid fixing bath and subsequent washing baths to remove all traces of the acid.

The Pestalozza method requires the use of a latex coagulant, which causes thickening of the latex even at room temperatures. The Pestalozza method also requires the maintenance of two adjoining sections of the extruding nozzle at different temperatures respectively.

The object of the present invention is to provide a simple and efficient method for producing rubber filaments and the like, which does not require the use of acid baths nor other normally active latex coagulants to effect coagulation, nor long volatilization conveyers for carrying the formed filaments away from the mouths of the nozzles from which the filaments are emitted, nor differential heating of the transitional-forming elements.

The improved method of manufacture of rubber articles according to the present invention resides in adding to latex a suitable quantity of a reagent which is entirely lacking in thickening or coagulative effect at ordinary or slightly elevated temperatures, but which causes rapid gelling and solidification of the latex above a minimum temperature determined by the quantity of reagent employed, and, to some extent, by the character of the latex employed, and then heating the latex in a suitable former, tube, etc., to the coagulation temperature, whereby coagulation takes place and a rubber article of the desired shape is formed.

In particular, that class of organic compounds known as nitro-paraffin derivatives, has been found especially suitable for use in the present invention. Typical members of this class of compounds are nitro-methane, nitro-ethane, 2-nitro-2-methyl-1: 3-propandiol, tri- (hydroxymethyl) nitro-methane and 1-nitro-propane.

All of these reagents have a greater or less gelling or solidifying effect on the latex above a minimum temperature, and some are especially efficient in causing gelation, for instance, nitro-ethane is outstanding as a gelling agent. It will be understood that in place of the nitro-paraffin derivatives other reagents having the characteristics hereinbefore described may be employed.

These substituted paraffin derivatives may be used in latex (normal or concentrated) in amounts up to about 3%, depending on their respective solubilities. Nitro-ethane, for example, is soluble in latex up to approximately 3.2%. Some other derivatives are much less soluble. In any event, they do not thicken or flocculate the latex at room temperature. When the latex is heated to a given temperature, which is governed and predetermined by the amount of reagent used, the latex quickly solidifies in the approximate shape of its container.

The following example will serve to illustrate the procedure employed and the effect obtained. A compound of the following composition is proposed:

| | |
|---|---|
| Latex, 60% solids | 167.0 |
| Sulfur dispersion, 50% solids | 3.5 |
| Zinc oxide dispersion, 50% solids | 6.0 |
| Accelerator dispersion, 50% solids | 2.0 |
| Nitro-ethane | 2.0 |

The several ingredients are mixed with the latex, after which the compound is ready to use. If it now be poured into a glass tube, say about one-half inch in diameter, and the tube is immersed in water at a temperature of 80° C., the contents of the tube will gel or solidify completely in about three minutes. On a temperature of 50° C., gelling may require as long as six to seven minutes.

The same compound, since it retains its original liquid condition at room temperature, may be readily passed through tubes of diameter as small as 0.01 inch, or less. If the tube is heated to 80°–90° C., as by placing it in a hot water bath, the latex will gel almost instantaneously to form a filament; and if pressure is applied to the latex supply, the filament will be formed in a continuous length, by being forced out of one end of the tube as fast as fresh latex is forced into the opposite end thereof.

In the accompanying drawings:

Fig. 1 illustrates, diagrammatically, in longitudinal sectional elevation, one form of apparatus capable of producing rubber filaments in accordance with the principles of the present invention;

Fig. 2 is a plan view;

Fig. 3 is an enlarged longitudinal sectional view of one portion of the transitional tube illustrating diagrammatically the first stage of conversion of the liquid latex into a solid form;

Fig. 4 is a view similar to Fig. 3 illustrating a subsequent period in the transitional stage, the emerging of the solid filament from the tube, and the washing thereof prior to reeling.

Fig. 5 is a side elevation of a second form of apparatus for producing rubber filaments etc. according to the present invention and wherein the transitional tubes are arranged vertically instead of horizontally as in Figs. 1, 2, 3 and 4;

Fig. 6 is a transverse sectional elevation taken on the line 6—6, Fig. 5;

Fig. 7 is an enlarged sectional view taken on the line 7—7, Fig. 5; and

Figs. 8 and 9 illustrate a detail of the apparatus shown in Figs. 5, 6 and 7.

As shown in Fig. 1, an apparatus capable of producing rubber thread, according to the principles of the present invention, includes a tube 1 of desired internal cross-sectional contour. The present invention is primarily, though not necessarily, directed to producing a continuous rubber filament of circular cross-section having a diameter, for example, of .010 inch. The tube 1 is preferably composed of glass and the internal diameter of the bore 2 would be slightly greater than the diameter of the filament, for example, the bore would have a diameter of approximately .013 inch, for reasons hereinafter set forth.

Preferably, the tube 1 is disposed horizontally, with one end 1a communicating with the interior of a reservoir 3 for a suitable body A of latex compound, composed, for example, of 60% pure latex, 35% water, 2% of heat sensitizer, and 3% of vulcanizing agents, which latter comprise sulfur, zinc oxide and accelerator. The compound hereafter will be referred to simply as "latex."

The liquid latex A is maintained at a static head $x$, within the reservoir 3, to cause the latex A to flow into the feed end 1a of the tube 1, and through the tube toward the discharge end 1b which is submerged in a body of water B contained in an open pan, or if desired, in a suitable closed container 4. A suitable inlet 5 is provided for the water entering the pan 4. The inlet 5, preferably, is located adjacent the discharge end 1b of the tube 1. An overflow 6 is provided, preferably at the opposite end of the tank 4, to maintain the water at a desired level above the tube 1. The tube 1 is submerged in the water B throughout substantially the full length of the tube, from the point 7, where the tube passes through one end wall 8 of the tank 4 to the discharge end 1b of said tube, situated inwardly from and in horizontally spaced relation to the opposite end wall 9 of the tank 4. The tube 1 is vertically spaced from the bottom 10 and laterally spaced from the side walls 11, 11 of the tank 4, to insure the presence of the water B completely around the tube.

The body of water B in the tank 4 is maintained at a temperature of approximately 87° C. The tube 1 is heated by the water B to approximately the same temperature, throughout the full length of that portion thereof which lies within the tank 4. The water B maintains the tube 1 at a temperature of approximately 87° C. uniformly throughout its length lying in the water B.

At the above-noted temperature of the tube 1, the latex A flowing into and through the tube 1 toward the discharge end 1b thereof will change rapidly from its purely liquid state indicated at $a^1$, Fig. 3, into a more or less slushy state indicated at $a^2$, as coagulation of the rubber particles suspended in the water is induced by the temperature of the tube 1. From the slushy state, the latex rapidly passes into a substantially solid state, indicated at $a^3$, Fig. 4.

During the period of transition from the purely liquid state $a^1$ to the solid state $a^3$, the solid constituent of the latex concentrates radially inward toward and around the longitudinal axis of the bore 2 of the tube 1, as shown at the right-hand side of Fig. 3; and the liquid constituent is forced radially outward into a film $c$, around the outside of the solid concentrate $a^3$ against the inner surface of the bore 2 of the tube 1, in the form of a sleeve.

The film $c$ is of a rather slimy character and due to its slippery characteristics functions as a lubricant between the inside of the tube 1 and the outside of the concentrate as it progresses from the slushy stage $a^2$ through the solidifying stage $a^3$ and emerges from the discharge end 1b of the transitional tube 1, as a solid filament A1.

The film c moves out of the transitional tube 1 with the solid filament A1 into the hot water B in the container 4, is indicated at $c^1$. Upon emerging from the discharge end 1b of the tube 1 into the hot water B in the tank 4, the lubricant $c^1$ is washed off or dissolved from the exterior of the solid filament, to prevent what is commonly termed "blooming."

The washed solid filament A1 passes around a roller 12 located in the tank 4 in spaced relation to the discharge end 1b of the transitional tube 1. From the roll 12, the filament passes part way around a drum 13 located outside the tank 4, thence to and around a second drum 14, and from this latter drum 14 to a winding reel 15.

The rolls 12, 13, 14 and the reel 15 are driven at the same or at different peripheral speeds, as desired, by any suitable mechanism not shown. Preferably, the roll 12 is driven at a peripheral speed corresponding to the linear speed of movement of the finished filament A1 outwardly from the discharge end 1b of the transitional tube 1, for example, at approximately 24 feet per minute for a filament of approximately .040 inch in diameter.

If it is desired to reduce the cross-sectional diameter or area of the filament below that which it has as it leaves the discharge end of the tube 1, without changing the cross-sectional contour, the filament may be stretched longitudinally between the roll 12 and the reel 15, by driving the rolls 13, 14 and reel 15 at progressively increasing speed ratios.

In operation, the head $x$ of liquid A in the container 3 continually maintains the feed end of the tube 1 filled to the full diameter of the bore 2 with the liquid latex. As the latex progresses through the tube, coagulation, due to the heating of the tube 1, takes place as indicated in Fig. 3, i. e., the latex changes from its free-flowing liquid state into the slushy or creamy state indicated at $a^2$. During this slushing or creaming state, the solid constituent of the liquid tends to concentrate inwardly and the liquid constituent tends to pass outwardly and surround the solidifying latex with a sleeve of such liquid which assumes a more or less slimy state.

In order to insure the feed end of the tube and that portion of the tube 1 between said feed end and the solidifying or coagulating being maintained constantly full of the liquid; and in order to prevent clogging of the tube, extraneous pressure is preferably applied to the liquid A within the upper portion 3a of the container 3, in the form of air or other gaseous fluid supplied to the upper end 3a of the container 3 from any suitable source of pressure through the pipe 16 under control of any suitable automatic or manually-controlled pressure and flow-regulating means. In the present instance, a manually-controlled valve 17 is shown for controlling the passage of the pressure producing gas into the upper portion 3a of the container 3.

The solid filament A1 is continuously drawn away from the discharge end 1b of the transitional tube 1 by power applied to all, or any one, or any number, of the rolls 12, 13, 14 and reel 15. The drawing of the solid constituent away from the discharge end of the tube as the pressure in the container forces the latex into and through the tube, relieves the tube of any clogging between the discharge end 1b and the portion of the tube in which the creaming, or initial solidification, is taking place within the tube 1, permitting the solidifying filament to form properly while within the tube 1 and before being discharged or withdrawn therefrom.

As shown in Fig. 4, the above procedure and the separation of the solid constituent from the liquid constituent of the latex A produces a filament of lesser cross-sectional dimension than the bore of the tube. Consequently, to produce a filament of predetermined size cross-sectionally, the cross-sectional dimensions of the tube must be greater than the cross-sectional dimensions of the finished filament, to the extent of the thickness of the film of lubricating slime c surrounding the filament and lying between the exterior thereof and the interior wall of the bore of the tube. The film c is of uniform thickness and completely surrounds the solidified filament A1; thus the filament A1 assumes the same shape or contour as the bore of the tube.

As shown in Fig. 2, any desired number of transitional tubes 1 may be provided in parallel, laterally spaced relation to each other in the tank 4, such plurality of tubes being suitably connected to a manifold 18 which is supplied with the liquid A from the container or reservoir 3, the number of tubes depending entirely upon the capacity of the reservoir and the rate at which the solidifying filaments A1 are withdrawn from, or discharged by, the end 1b of each tube 1. The rolls 12, 13, 14 and reel 15 are of corresponding length to accommodate the plurality of filaments A1 in laterally spaced relation as they are discharged by the tubes 1, 1, respectively; pass around the rolls 12, 13 and 14; and are wound on the reel 15.

Preferably, the drums or rolls 13 and 14, one or the other, or both thereof, are heated to a temperature of approximately 200° F. This immediately evaporates the water clinging to the filament A1 as it leaves the tank 4, and further effects vulcanization of the filaments prior to their winding on the reel 15.

If the rolls 12 and 13, for example, are run at a peripheral speed corresponding to the coagulating speed of the latex within the tube 1 and the roll 14 and reel 15 are run at a relatively higher peripheral speed to effect stretching of the filaments between the rolls 13 and 14, while the filament is in a partially cured state, the stretch of the filaments longitudinally and the corresponding decrease in the thickness of the cross-sectional dimensions of the filament become permanent under final vulcanization of the filaments by contact with the heated roll 14.

After leaving the roll 14, and before winding on the drum or reel 15, the filaments, if desired, may be run through a suitable talc-applying device, to prevent clinging of the filaments one to another, or clinging of the layers on the reel 15.

Any suitable means may be provided for maintaining the head $x$, or for replenishing the supply of latex, in the reservoir 3, such for example as supplementary interchangeable reservoirs 23 inverted in a cup 24 connected to the reservoir 3 by a pipe 25 which is provided with a stop cock, or other flow control 26, the outlet 23a of the removable reservoir 23 being located in the plane of the level of the head $x$. As the level $x$ drops and uncovers the end 23a of the reservoir 23, said level will be automatically re-established by flow from the reservoir 23.

If extraneous pressure is supplied through the pipe 16, the cock 26 may be operated to fill the reservoir 3 to the level $x$ and then closed to prevent back pressure when the valve 17 is opened to admit the extraneous pressure to the reservoir 3. During such filling of the reservoir 3, the interior thereof is opened to exhaust, and for that purpose the valve 17 is preferably of the three-way type, to admit the pressure and to exhaust the pressure to and from the interior of the reservoir 3 alternately.

Obviously, strips or sheets may be produced by changing the interior cross-sectional contour and dimensions of the tube 1, and tubes may be produced by placing a stationary core within the tube in peripheral spaced relation to the interior wall of the tube.

As shown in Figs. 5, 6 and 7, the transitional tubes 101 are of the same character as the tubes 1 of Figs. 1 to 4 inclusive, but instead of being arranged horizontally, as are the tubes 1, the tubes 101 are arranged vertically in laterally spaced relation to each other, as shown in Fig. 5, with two series of tubes respectively disposed at opposite sides of a vertical plane extending longitudinally of the machine, as shown in Fig. 6.

The upper receiving end 101a in each of the tubes 101 is in communication with a supply of liquid latex A contained in an elevated reservoir 103, while the discharge end 101b of each tube 101 is submerged in a body of hot water B contained in an open pan or trough 104.

Each tube 101 is enclosed within and surrounded by a concentric sleeve or water jacket 111, preferably a glass tube having an internal bore of greater diameter than the external diameter of the tube 101, which preferably is also a glass tube, whereby a body of hot water B will at all times surround each of the transitional tubes 101 from the lower discharge end 101b thereof substantially up to the receiving end 101a of the tube.

As previously noted, in regard to the structure of Figs. 1, 2, 3 and 4, the water B in the trough 104 and in each of the water jackets 111 is maintained at approximately 87° C.

The upper end of each water jacket 111 terminates in a fitting 108 which is connected by a transverse pipe 107 to a water supply manifold 105. The troughs 104, 104 are each connected to a return water manifold 106 by a pipe 109.

The supply manifold 105 is connected to a suitable water heater 130 by which the aforesaid temperature of the water is maintained. The return manifold 106 is connected by a pipe 131 to the inlet side of a suitable water circulating pump 132, the outlet or discharge side of which is connected by a pipe 133 to the heater 130. The circulating pump 132 is constantly operated by a suitable motor 134 through any suitable belt or gear transmission.

As shown in Fig. 7 each transitional tube 101 passes upwardly through its associated fitting 108 into and through a suitable packing gland 135 formed in a short nipple 136. In the present instance the packing gland 135 is illustrated as merely comprising a body of cement which in addition to preventing passage of hot water from the fitting 108 upwardly around the tube 101 functions to support the upper end of the tube 101 within its water jacket 111 in concentric spaced relation to the water jacket.

The lower end of each tube 101 adjacent the lower end of the water jacket 111 is centralized by a perforated disc 137 by which downward flow of the hot water through the water jacket is retarded.

The short nipple 136 connects the upper end of the hot water fitting 108 with the lower end of a cold water fitting 138. Threaded into the upper end of the cold water fitting 138 is a plug 139 through which the upper end of the tube 101 extends, a packing gland 140 being provided in the plug 139 to prevent escape of cold water upwardly from the fitting 138 around the tube 101. A second plug 141 which forms part of said packing gland is threaded into the upper end of the plug 139 and is externally threaded above said plug to receive the internal threads of one side of an L fitting 142, the second side of which is connected by a pipe 143 to the manifold 118 which distributes the liquid latex A from the reservoir 103 to the transitional tubes 101 through a pipe 125, under control of the valve 126, which connects the reservoir 103 with one end of the latex manifold 118, as shown in Fig. 5.

As shown in Fig. 7 the receiving end 101a of each transitional tube 101 extends above the upper surface 141a of the plug 141 and which is disposed at an elevation below that of the feed pipe 143, whereby a small sump 145 is provided around and below the upper end 101a of the tube 101 to receive and retain any small premature coagulations of the latex A to prevent such premature coagulation from clogging the upper end 101a of the tube 101.

The cold water fittings 138, 138 are connected in series in the present instance, by pipes 146, the first of the fittings 138 being connected by a pipe 147, under control of a valve 148, with any available source of cold water while the last of the fittings 138 of the series is connected by a pipe 149 to any available waste water system.

Pressure in the upper end of the reservoir 103 above the body of latex A therein is maintained in the present instance by a suitable air compresser 144 for the purpose of forcing the liquid latex through the feed pipe 125, the manifold 118, pipes 143, 143, and fittings 142, 142 into the inlet ends 101a of the tubes 101, through said tubes and out of the discharge ends 101b thereof into the hot water B in the troughs 104.

In each trough 104, adjacent the lower end 101b of each tube 101, is a guide wheel 112 around which the formed filament A1 leaving the tube 101 is passed to a second guide wheel 113 located adjacent the upper end of the tube, or to a guide wheel 114 located above the trough 104.

In either case when longitudinal stretching and consequent reduction in cross-section of the formed filament or other element A1 take place, such stretching will be effected between the guide wheel 112 and the guide wheel 114. However, if no longitudinal elongation and cross-sectional reduction is desired the formed filament or other continuous element is preferably passed directly from the guide wheel 112 to and around the guide wheel 114, as shown in broken line in Fig. 6. The guide wheels may be rotatably mounted on any suitable supports carried by the end frames of the machine.

From the guide wheel 114, the continuous element A1 passes to an individual reel 115, through a talc box 150 and a guide eye 151 on a longitudinally reciprocable traverse bar 152 which is slidably mounted in guides 153 secured to the end frames 154, 155 of the machine.

A traverse cam 156 working against a cam follower carried by a lever 157 which is pivoted to the frame 155 and has operative connection with the traverse bar 152 moves said bar and the guides 151 carried thereby in one direction across the faces of the reels 115, 115 to lay the talced elements A2, A2 in convolutions on said reels. A spring 158 rocks the lever and moves the bar and guides in the opposite direction.

Each reel 115 is independently supported for separate rotation on a roller 159, against which the rims 160 of said reels rest, and a driving roller 161 which preferably is of an expansible and contractible nature to drive the various reels at necessarily slightly varying speeds for taking care of any slightly varying discharge rates of the various tubes 101 independently.

It has been found that each tube 101 has an individual normal rate of discharge which might vary slightly from the normal discharge rate of the other tubes, due to slight variation within the small internal bores of the various tubes but once the normal discharge rate of any single tube is established it seldom, if ever, varies therefrom during the active life of the tube. Consequently it is possible to definitely determine the exact necessary rate of speed of the reel 115 associated with each tube.

In Figs. 8 and 9 a simple form of expansible and contractible drive roll 161, for effecting the necessary variations in speeds between the reels 115 is disclosed.

Each drive roll 161 includes a wooden or metal core 162 adapted to be keyed, pinned or otherwise secured to a common drive shaft 163 which is rotatably mounted in the end frames 154 and 155.

Each core 162 is covered with a strip of friction material 165, such as cork etc. having a pointed end 166 and a recessed end 167 adapted, when the strip 165 is wrapped around the core 162, to fit one within the other to a greater or lesser degree and form a continuous peripheral surface 168 for contact with the filament A2 wound on the reel 115.

The strip 165 is preferably held on the core 162 by a body of glue, cement or other suitable adhesive 169 and by varying the thickness of the body of adhesive uniformly around the core 162, the effective diameter of the driving face 168 may be increased or diminished to give a peripheral speed of the driving face 168 which corresponds to the discharge rate of the tube 101 with which the particular drive roll 161 is associated; and, as the face 168 makes direct contact with the element A2 on the reel 115 the element A2 may be wound on the reel at the rate at which it is discharged from the tube, it being noted that the length of the drive roll 161 is slightly less than the width of the face of the reel intermediate the end flanges 160 thereof in order that the driving face 168 of the roll 161 will at all times be in direct contact with the outermost layer of the formed element A2 on the reel.

The drive shaft 163 may be rotated at the correct speed by any suitable means of transmission from the motor 134 which drives the water pump 132 or from an independent source of power. In the present instance, a drive is diagrammatically illustrated to include a pulley or sprocket 171, on the armature shaft of the motor 134, connected by a belt or chain 172 to a similar wheel 173 on the pump shaft.

As a matter of illustration, the pump shaft may also be provided with a gear, pulley, or sprocket 174 connected by a train of gears, belts or sprocket chain 175 to a gear, pulley, or sprocket 176 on each of the two drive roll shafts 163 at the opposite sides respectively of the machine.

One or both of the shafts 163 may be provided with a sprocket or gears 179 connected to a similar wheel 180 on the hub of the traverse cam 156 to rotate the cam at a definite speed ratio with respect to the reels 115, whereby the eyes 151 will be moved back and forth across the faces of the reels to lay the elements A2 in laterally abutting or laterally spaced convolutions, as desired, on the reels.

The speed of take up of the reels 115 has been described as being substantially the same as the rate of discharge of the tubes 101. This is literally true when the solidified latex element A1 discharged from each tube 101 is not to be stretched intermediate the discharge end 101b of each tube and the reel 115 associated therewith to increase its length and decrease its cross-sectional area. Under these circumstances it may be advisable to run the element directly from the guide wheel 112 to and around the guide wheel 114 for passage through the talc box on its way to the reel. It will be understood that when a longitudinal elongation and consequent cross-sectional reduction is to be made in the continuous element discharging from the lower ends 101b of the tubes 101, the take up speeds of the reels 115 respectively associated with the tubes 101 will be increased accordingly, thus, in either case, the speeds of the reels will be consistent with the rate of discharge of the tubes.

From the above it will be clear that liquid latex A, passed into the upper ends 101a of the transitional tubes 101 and down through the tubes to and out of the discharge ends 101b thereof will change from its liquid form A to a solidified form A1, within and while passing through the tubes, due to the temperature of the tubes as maintained by the body of hot water B which surrounds each tube throughout its length from its discharge end 101b practically to its receiving end 101a.

In order to prevent conduction of heat along the tubes 101 up to the receiving ends 101a thereof, which might tend to cause premature coagulation or slushing of the latex A at and around the receiving ends 101a of the tubes, the tubes may each extend through the cold water fittings 138 directly above the hot water fittings 108, if desired, to chill the tubes at their upper ends and thereby control the beginning of the transition of the latex from its liquid state to its solid state, in order that such change can only start within the tubes 101, thus preventing premature coagulation around the upper ends 101a of the tubes, should it be found that a tendency toward this end occurs.

I claim:

1. The process of producing rubber elements including filaments strips and the like, which consists in passing a liquid latex compound through and out one end of a forming tube directly into a body of hot water surrounding said end and a substantial portion of the length of the tube adjacent thereto, and maintaining said body of water at a temperature sufficient to effect transition of the latex from a liquid to a solid state within the tube prior to emerging therefrom into the water.

2. The process of producing rubber elements including filaments strips and the like, which consists in passing a liquid latex compound through and out one end of a forming tube directly into a body of hot water surrounding said end and a substantial portion of the length of the tube adjacent thereto, maintaining said body of water at a temperature sufficient to effect reaction in the compound by which transition of the latex from a liquid to a solid state is produced and forms the rubber element with residue of the compound surrounding said element and functioning as a lubricant therefor within the tube prior to said element emerging from the tube into the water, and drawing said element away from said tube end through said body of water at a rate commensurate with the rate of transition to keep the tube end clear and to remove said residue from said element.

3. The process of producing rubber elements including filaments, strips and the like, which consists in passing a liquid latex composition through a forming tube, heating the tube uniformly throughout a substantial portion of its length to effect transition of the latex from its liquid state into a solid state within the tube, drawing the solidified rubber element away from the tube at a speed consistent with said transition, and completely submerging and washing the solidified rubber element as it emerges from the tube in hot water within a temperature range of from 80° C. to 90° C. surrounding the tube and functioning also to effect said uniform heating of the tube.

4. Apparatus for producing rubber elements including filaments, sheets, strips, tubes and the like from a liquid latex compound, comprising a transitional tube for continuous passage of said latex therethrough, and means for constantly maintaining a body of hot water at a predetermined temperature around said tube throughout a substantial portion of the length of the tube to heat said portion uniformly and thereby effect a change in said latex from its liquid to a solid form within said tube during said passage, the delivery end of said tube being submerged in and arranged for discharging the resulting solidified rubber element into said body of hot water.

5. Apparatus for producing rubber filaments, sheets, strips, tubes and the like from a liquid latex compound, comprising a transitional tube for continuous passage of said latex therethrough, means for constantly maintaining a body of hot water at a predetermined temperature around said tube throughout substantially the full length of the tube to effect a change in said latex from its liquid to a solid form within said tube during said passage, and means intermediate the receiving end of the tube and the last said means for chilling said tube therebetween to prevent premature change in state of the liquid at the receiving end of the tube.

6. Apparatus for producing rubber elements including filaments, sheets, strips, tubes and the like from a liquid latex compound, comprising a transitional tube for continuous passage of the compound therethrough, a water jacket for hot water surrounding the tube from a point adjacent the discharge end of the tube to a point adjacent the receiving end of the tube, a cold water jacket surrounding the tube intermediate said hot water jacket and said receiving end of the tube, and a receptacle for hot water at the discharge end of the tube for submerging the delivery end of the tube and the adjacent end of the hot water jacket in the water contained in said receptacle.

7. Apparatus for producing rubber elements including filaments, sheets, strips, tubes and the like from a liquid latex compound, comprising a transitional tube for continuous passage of the compound therethrough, a water jacket for hot water surrounding the tube from a point adjacent the discharge end of the tube to a point adjacent the receiving end of the tube, a cold water jacket surrounding the tube intermediate said hot water jacket and said receiving end of the tube, a receptacle for hot water at the discharge end of the tube for submerging the delivery end of the tube and the adjacent end of the hot water jacket in the water contained in said receptacle, means for circulating hot water through said hot water jacket and said receptacle to maintain uniform temperature of the water therein, and a perforated disc in the hot water jacket and surrounding said tube adjacent the discharge end of the tube to retard the flow of said hot water from said hot water jacket into said receptacle in the course of said circulation.

THOMAS F. HASSETT.